(12) United States Patent
Fang

(10) Patent No.: US 11,132,411 B2
(45) Date of Patent: Sep. 28, 2021

(54) SEARCH INFORMATION PROCESSING METHOD AND APPARATUS

(71) Applicant: ADVANCED NEW TECHNOLOGIES CO., LTD., Grand Cayman (KY)

(72) Inventor: Fang Fang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 257 days.

(21) Appl. No.: 16/285,760

(22) Filed: Feb. 26, 2019

(65) Prior Publication Data

US 2019/0188227 A1 Jun. 20, 2019

Related U.S. Application Data

(63) Continuation of application No. PCT/CN2017/098225, filed on Aug. 21, 2017.

(30) Foreign Application Priority Data

Aug. 31, 2016 (CN) .......................... 201610794508.2

(51) Int. Cl.
*G06F 16/00* (2019.01)
*G06F 16/953* (2019.01)
(Continued)

(52) U.S. Cl.
CPC ............ *G06F 16/953* (2019.01); *G06F 16/00* (2019.01); *G06F 16/3331* (2019.01);
(Continued)

(58) Field of Classification Search
CPC .......... G06F 16/40; G06F 16/44; G06F 16/53; G06F 16/63; G06F 16/73; G06F 16/74;
(Continued)

(56) References Cited

U.S. PATENT DOCUMENTS

| | | |
|---|---|---|
| 5,715,443 A | 2/1998 | Yanagihara et al. |
| 5,819,273 A | 10/1998 | Vora et al. |

(Continued)

FOREIGN PATENT DOCUMENTS

| | | |
|---|---|---|
| CN | 100409234 C | 8/2008 |
| CN | 101317176 A | 12/2008 |

(Continued)

OTHER PUBLICATIONS

Decision to reject for Taiwanese Application No. 106120045 dated Sep. 10, 2019 (4 pages).

(Continued)

*Primary Examiner* — Ashish Thomas
*Assistant Examiner* — Rezwanul Mahmood

(57) ABSTRACT

Methods, systems, and apparatus, including computer programs encoded on computer storage media, for processing search information. One of the methods includes receiving search information from a user and sending the search information to a cloud server to cause the cloud server to perform search processing based on the search information. The method further includes pushing display information to the user on a display interface before the cloud server returns a result associated with the search processing.

15 Claims, 4 Drawing Sheets

US 11,132,411 B2
Page 2

(51) Int. Cl.
*G06F 16/63* (2019.01)
*G06F 16/53* (2019.01)
*G06F 16/73* (2019.01)
*G06F 16/33* (2019.01)

(52) U.S. Cl.
CPC .............. *G06F 16/53* (2019.01); *G06F 16/63* (2019.01); *G06F 16/73* (2019.01)

(58) Field of Classification Search
CPC ...... G06F 16/95; G06F 16/245; G06F 16/248; G06F 16/338; G06F 16/738; G06F 16/953; G06F 16/3331; G06F 16/9535; G06F 16/3538; G06F 16/90328
USPC .......................................................... 707/769
See application file for complete search history.

(56) References Cited

U.S. PATENT DOCUMENTS

| | | | |
|---|---|---|---|
| 5,895,455 A | 4/1999 | Bellinger et al. | |
| 5,996,007 A | 11/1999 | Klug et al. | |
| 6,404,446 B1 | 6/2002 | Bates et al. | |
| 6,862,713 B1 | 3/2005 | Kraft et al. | |
| 7,031,965 B1 | 4/2006 | Moriya et al. | |
| 7,117,442 B1* | 10/2006 | Kemble | G06F 16/9038 715/727 |
| 7,453,479 B2 | 11/2008 | Le et al. | |
| 7,516,124 B2 | 4/2009 | Kasperski | |
| 7,681,124 B2 | 3/2010 | Gunn et al. | |
| 7,730,405 B2* | 6/2010 | Gulli | G06F 16/738 715/719 |
| 7,788,248 B2 | 8/2010 | Forstall et al. | |
| RE42,413 E | 5/2011 | Snyder | |
| 8,090,703 B1* | 1/2012 | Agarwal | G06Q 30/0244 707/707 |
| 8,260,769 B1* | 9/2012 | Fuller | G06F 16/24539 707/721 |
| 8,484,208 B1* | 7/2013 | Raghavan | G06F 16/248 707/728 |
| 8,612,439 B2 | 12/2013 | Prahlad et al. | |
| 8,868,574 B2 | 10/2014 | Kiang et al. | |
| 9,342,553 B1* | 5/2016 | Fuller | G06F 16/245 |
| 9,355,183 B2 | 5/2016 | Williams | |
| 9,612,726 B1* | 4/2017 | Chelba | H04N 21/4316 |
| 10,645,225 B1* | 5/2020 | Stoops | G06T 3/0093 |
| 2002/0161627 A1* | 10/2002 | Gailey | G06F 16/9535 186/35 |
| 2002/0199002 A1* | 12/2002 | Quimby | G06F 30/12 709/227 |
| 2003/0028889 A1* | 2/2003 | McCoskey | G06F 21/10 725/91 |
| 2003/0055816 A1* | 3/2003 | Paine | G06Q 30/02 |
| 2003/0110161 A1* | 6/2003 | Schneider | G06F 16/951 |
| 2005/0055643 A1* | 3/2005 | Quimby | G06F 16/954 715/763 |
| 2005/0182754 A1* | 8/2005 | Madan | G06F 16/9535 |
| 2007/0067305 A1 | 3/2007 | Ives | |
| 2007/0143493 A1* | 6/2007 | Mullig | G06F 16/40 709/232 |
| 2007/0174244 A1* | 7/2007 | Jones | G06F 16/24578 |
| 2007/0255693 A1* | 11/2007 | Ramaswamy | G06F 16/3331 |
| 2008/0005069 A1* | 1/2008 | Payne | G06F 16/9535 |
| 2008/0021721 A1* | 1/2008 | Jones | G09B 7/04 434/350 |
| 2008/0021884 A1* | 1/2008 | Jones | G06F 16/951 |
| 2008/0071929 A1 | 3/2008 | Motte et al. | |
| 2008/0086451 A1* | 4/2008 | Torres | G06F 16/951 |
| 2008/0114731 A1* | 5/2008 | Kumar | G06F 16/954 |
| 2008/0320304 A1* | 12/2008 | Fontijn | G01C 21/26 713/165 |
| 2009/0083256 A1* | 3/2009 | Thompson | G06F 16/738 |
| 2010/0030734 A1* | 2/2010 | Chunilal | G06Q 10/10 707/770 |
| 2010/0082603 A1* | 4/2010 | Krompass | G06F 16/24542 707/719 |
| 2010/0138402 A1* | 6/2010 | Burroughs | G06F 16/3344 707/706 |
| 2010/0262618 A1* | 10/2010 | Hedinsson | G06F 16/70 707/770 |
| 2010/0293048 A1* | 11/2010 | Singolda | G06Q 30/0244 705/14.43 |
| 2011/0029484 A1* | 2/2011 | Park | G06F 16/217 707/634 |
| 2011/0029485 A1* | 2/2011 | Park | G06F 16/2358 707/634 |
| 2011/0184971 A1 | 7/2011 | Lin et al. | |
| 2012/0023126 A1* | 1/2012 | Jin | G06F 16/73 707/769 |
| 2012/0041967 A1* | 2/2012 | Askey | G06F 16/686 707/769 |
| 2012/0066393 A1* | 3/2012 | Tekwani | G06F 16/9535 709/226 |
| 2012/0135723 A1* | 5/2012 | Ramo | G06F 16/9535 455/418 |
| 2012/0173502 A1* | 7/2012 | Kumar | G06F 16/48 707/706 |
| 2012/0174011 A1* | 7/2012 | Cabrera-Cordon | G06Q 10/00 715/769 |
| 2012/0229629 A1* | 9/2012 | Blumstein-Koren | G06F 16/7837 348/143 |
| 2012/0304065 A1* | 11/2012 | Cai | G06F 16/748 715/719 |
| 2013/0080460 A1 | 3/2013 | Tomko et al. | |
| 2013/0110595 A1* | 5/2013 | Acosta-Cazaubon | G06Q 30/02 705/14.7 |
| 2013/0124973 A1* | 5/2013 | Piccionelli | G06Q 30/0266 715/234 |
| 2013/0158984 A1* | 6/2013 | Myslinski | G06F 16/951 704/9 |
| 2013/0166580 A1* | 6/2013 | Maharajh | H04W 4/18 707/758 |
| 2013/0246457 A1* | 9/2013 | Stojancic | G06F 16/434 707/769 |
| 2013/0275530 A1* | 10/2013 | Matson | H04L 51/24 709/206 |
| 2013/0308636 A1* | 11/2013 | Bacthu | H04L 12/185 370/390 |
| 2014/0067858 A1* | 3/2014 | Jacobson | G06Q 30/02 707/769 |
| 2014/0156650 A1* | 6/2014 | Jacobson | G06Q 10/10 707/723 |
| 2014/0161241 A1* | 6/2014 | Baranovsky | H04M 3/5232 379/142.05 |
| 2014/0172562 A1* | 6/2014 | Weatherford | G06Q 30/0256 705/14.54 |
| 2014/0250145 A1* | 9/2014 | Jones | G06F 16/3329 707/769 |
| 2014/0258865 A1* | 9/2014 | Papish | H04N 21/25891 715/719 |
| 2014/0330770 A1* | 11/2014 | Yerli | G06F 16/9535 707/609 |
| 2014/0335897 A1* | 11/2014 | Clem | G08G 1/147 455/456.3 |
| 2015/0095366 A1* | 4/2015 | Mo | H04N 21/475 707/769 |
| 2015/0113013 A1* | 4/2015 | Rys | G06F 16/24 707/758 |
| 2015/0142778 A1* | 5/2015 | Bilinski | G06F 16/3349 707/722 |
| 2015/0186938 A1* | 7/2015 | Zhang | G06Q 30/0256 705/14.54 |
| 2015/0293954 A1* | 10/2015 | Hsiao | G06F 16/24568 715/738 |
| 2015/0293999 A1* | 10/2015 | Zhan | G06F 40/137 707/723 |
| 2015/0295778 A1* | 10/2015 | Hsiao | H04L 43/0894 715/736 |

(56) References Cited

U.S. PATENT DOCUMENTS

| | | | |
|---|---|---|---|
| 2015/0295780 A1* | 10/2015 | Hsiao | H04L 43/022 715/736 |
| 2015/0295796 A1* | 10/2015 | Hsiao | H04L 41/0813 715/738 |
| 2015/0317678 A1* | 11/2015 | Huang | G06Q 30/0256 705/14.54 |
| 2015/0341212 A1* | 11/2015 | Hsiao | G06F 3/0482 715/735 |
| 2015/0363499 A1 | 12/2015 | Cheng | |
| 2015/0370893 A1* | 12/2015 | Checkley | G06F 17/3082 707/721 |
| 2016/0044349 A1* | 2/2016 | Jackson | H04N 21/44222 725/20 |
| 2016/0078471 A1* | 3/2016 | Hamedi | H04L 67/1072 705/14.41 |
| 2016/0092447 A1* | 3/2016 | Venkataraman | G06F 16/732 707/765 |
| 2016/0171527 A1* | 6/2016 | Venkataraman | G06F 16/24578 705/14.45 |
| 2016/0226944 A1* | 8/2016 | Hsiao | H04L 43/028 |
| 2016/0246845 A1* | 8/2016 | Banerjee | G06F 16/24564 |
| 2016/0294606 A1* | 10/2016 | Puri | H04L 43/04 |
| 2016/0343032 A1* | 11/2016 | DeWitt | G06Q 30/0256 |
| 2017/0083572 A1* | 3/2017 | Tankersley | G06F 3/04847 |
| 2017/0085446 A1* | 3/2017 | Zhong | H04L 41/12 |
| 2017/0085447 A1* | 3/2017 | Chen | H04L 43/024 |
| 2017/0092089 A1* | 3/2017 | Ye | G08B 1/08 |
| 2017/0093645 A1* | 3/2017 | Zhong | H04L 67/10 |
| 2017/0154080 A1* | 6/2017 | De Smet | G06F 16/24568 |
| 2017/0169820 A1* | 6/2017 | Chen | G10L 15/02 |
| 2017/0289090 A1* | 10/2017 | Yao | H04L 51/10 |
| 2017/0323270 A1* | 11/2017 | Gibbs | G06Q 10/1053 |
| 2018/0089601 A1* | 3/2018 | Link | G06F 16/90335 |
| 2018/0105051 A1* | 4/2018 | Zheng | G06Q 20/3276 |
| 2018/0248705 A1* | 8/2018 | Schexnaydre | H04L 63/0823 |
| 2018/0315091 A1 | 11/2018 | Dewitt et al. | |
| 2018/0352398 A1* | 12/2018 | Zhang | H04M 1/724 |
| 2019/0188227 A1* | 6/2019 | Fang | G06F 16/63 |
| 2020/0034492 A1* | 1/2020 | Verbeke | G10L 15/24 |
| 2020/0100302 A1* | 3/2020 | Xu | H04W 48/14 |
| 2020/0104632 A1* | 4/2020 | Liu | G06K 9/6202 |

FOREIGN PATENT DOCUMENTS

| | | |
|---|---|---|
| CN | 101405733 A | 4/2009 |
| CN | 101499080 A | 8/2009 |
| CN | 102332017 A | 1/2012 |
| CN | 103699588 A | 4/2014 |
| CN | 102915342 B | 8/2016 |
| CN | 106909603 A | 6/2017 |
| JP | H09-135265 A | 5/1997 |
| JP | 2000-121375 A | 4/2000 |
| JP | 2001-022786 A | 1/2001 |
| JP | 2001-223712 A | 8/2001 |
| JP | 2009-524157 A | 6/2009 |
| TW | 201601104 A | 1/2016 |
| WO | 2007089967 A2 | 8/2007 |
| WO | 2013190697 A1 | 12/2013 |
| WO | 2014013139 A1 | 1/2014 |

OTHER PUBLICATIONS

First Search for Chinese Application No. 201610794508.2 dated Sep. 19, 2019 (1 page).
First Office Action for Chinese Application No. 201610794508.2 dated Sep. 29, 2019 with English machine translation (13 pages).
Written Opinion of the International Searching Authority and International Search Report for PCT Application No. PCT/CN2017/098225 dated Nov. 22, 2017 (15 pages).
International Preliminary Report on Patentability Chapter I for PCT Application No. PCT/CN2017/098225 dated Mar. 14, 2019 (12 pages).
Non-final rejection and Search Report for Taiwanese Application No. 106120045 dated Mar. 27, 2019 (6 pages).
Office Action for Japanese Application No. 2019-511878 dated Mar. 31, 2020.
Search Report for European Application No. 17845265.2 dated Mar. 9, 2020.
Younghwa Lee et al., "Can online wait be managed? The effect of filler interfaces and presentation modes on perceived waiting time online—1 Introduction", Jun. 30, 2012.

* cited by examiner

SEARCH INFORMATION PROCESSING METHOD AND APPARATUS

CROSS-REFERENCE TO RELATED APPLICATIONS

This application is a continuation application of International Application No. PCT/CN2017/098225, filed on Aug. 21, 2017, which is based on and claims priority to and benefits of Chinese Patent Application No. 201610794508.2 filed with the State Intellectual Property Office (SIPO) of the People's Republic of China on Aug. 31, 2016. The entire contents of the above-identified applications are incorporated herein by reference.

TECHNICAL FIELD

This application relates to Internet technologies, and in particular, to a search information processing method and apparatus.

BACKGROUND

With the rapid development of Internet technologies, in various aspects of people's daily life, information can be rapidly obtained and services can be implemented conveniently and fast by using networks.

Usually, people can enter keywords in forms of characters or voice by using various search tools of the Internet, and wait for a search result automatically matched by the network. However, regardless of whether a network speed is fast or slow, in a process in which the search result is matched for a user in cloud, the user can only stare at an interface of an electronic device (such as a mobile phone or a computer) and wait. Usually, a ring symbol or a wave symbol is displayed on the interface of the electronic device in a process of loading the search result, so that the user learns that search is being performed. During this period of time, the user can only wait for the search result. Consequently, the experience is not very good.

SUMMARY

The specification provides a search information processing method and apparatus, to resolve the technical problem in the existing technology that a user cannot obtain any information associated with search content in a process of waiting for a search result.

According to one aspect, the specification provides a search information processing method, including:
receiving search information entered by a user;
sending the search information to a cloud server to cause the cloud server to perform search processing according to the search information; and
before the cloud server returns a search processing result, pushing display information having content to the user on a display interface.

In this embodiment, display information having content is pushed to a user waiting for a search processing result, so that the user does not need to wait for the search result dully, and the user can obtain the display information in a waiting process, and interact with a search interface, thereby improving perceptibility and user experience.

In an implementation, the display information having content includes at least one of the following:
a picture, audio, a video, an animation, and text.

In an implementation, the pushing display information having content to the user on a display interface includes:
pushing, according to a preset setting by the user on display information, display information satisfying the preset setting to the user; and/or
pushing, according to the search information entered by the user, display information associated with the search information to the user.

In an implementation, the preset setting includes at least one of the following settings: a setting on a display form of the display information, and a setting on information content of the display information.

In this embodiment, display information satisfying personalized requirements is provided to a user through diversified settings on the display information. The user can preset a form, content, and a display sequence of the display information, to enrich the presented display information, and improve user experience.

In an implementation, the pushing, according to a preset setting by the user on display information, display information satisfying the preset setting to the user includes:
obtaining the display information from a preset local storage, and pushing the display information to the user; and/or
receiving, according to a preset setting by the user on content to be pushed by the cloud server, the display information returned by the cloud server, and pushing the display information to the user.

In an implementation, the pushing, according to the search information entered by the user, display information associated with the search information to the user includes:
pushing, according to the search information entered by the user, display information associated with an information type of the search information to the user, and/or display information associated with information content of the search information.

In an implementation, the preset setting by the user on the content to be pushed by the cloud server includes display information subscribed to by the user from the cloud server; and
the subscribed display information includes at least one of the following: weather information, advertisement information, and current news.

In this embodiment, display information is obtained from different places such as a local memory and a cloud server, to provide diversified display information to a user. Information in which the user is interested may be obtained from a resource stored by the user, or information in which the user is interested may be subscribed to from cloud, to fully use a waiting time period in a search process, so that a process of waiting for a search result by the user becomes interesting, thereby improving user experience.

In an implementation, the method further includes:
receiving the search processing result returned by the cloud server; and
stopping pushing the display information, and pushing the search processing result to the user on the display interface.

According to another aspect, the specification provides a search information processing apparatus. Functions of the apparatus may be implemented by using hardware or may be implemented by using hardware executing corresponding software. The hardware or software includes one or more modules corresponding to the foregoing functions. Specifically, the apparatus includes:
a receiving module, configured to receive search information entered by a user;

a sending module, configured to send the search information to a cloud server to cause the cloud server to perform search processing according to the search information; and a pushing module, configured to, before the cloud server returns a search processing result, push display information having content to the user on a display interface.

According to another aspect, an embodiment provides a search information processing method comprising: receiving search information from a user; sending the search information to a cloud server to cause the cloud server to perform search processing based on the search information; and before the cloud server returns a result associated with the search processing, pushing display information to the user on a display interface.

In some embodiments, the display information comprises at least one of the following: a picture, audio, a video, an animation, and text.

In some embodiments, the display information comprises: information satisfying a setting by the user; or information associated with the search information.

In other embodiments, the setting comprises: a setting on a display form of the display information; or a setting on information content of the display information.

In other embodiments, the information associated with the search information comprises: information associated with a type of the search information; or information associated with content of the search information.

In still other embodiments, the pushing display information to the user on a display interface comprises: obtaining the display information from a preset local storage; and pushing the display information to the user.

In still other embodiments, the pushing display information to the user on a display interface comprises: receiving the display information from the cloud server according to a setting by the user; and pushing the display information to the user.

In yet other embodiments, the setting comprises display information subscribed to by the user from the cloud server; and the subscribed display information comprises at least one of the following: weather information, advertisement information, and current news.

In yet other embodiments, the method further comprises receiving the result associated with the search processing from the cloud server; stopping pushing the display information to the user; and pushing the result to the user on the display interface.

According to still another aspect, an embodiment provides a system comprising a processor and a non-transitory computer-readable storage medium storing instructions executable by the processor to cause the system to perform operations comprising: receiving search information from a user; sending the search information to a cloud server to cause the cloud server to perform search processing based on the search information; and before the cloud server returns a result associated with the search processing, pushing display information to the user on a display interface.

According to yet another aspect, an embodiment provides a non-transitory computer-readable storage medium configured with instructions executable by one or more processors to cause the one or more processors to perform operations comprising: receiving search information from a user; sending the search information to a cloud server to cause the cloud server to perform search processing based on the search information; and before the cloud server returns a result associated with the search processing, pushing display information to the user on a display interface.

In the specification, search information entered by a user is received, and the search information is sent to a cloud server to cause the cloud server to perform search processing according to the search information. Before the cloud server returns a search processing result, display information having content is pushed to the user on a display interface. In this way, the user does not need to wait for the search result dully. The user can obtain display content in a waiting process, and the waiting process is not that dull, thereby improving user experience.

BRIEF DESCRIPTION OF THE DRAWINGS

To describe the technical solutions in the embodiments of the specification or in the existing technology more clearly, the following briefly describes the accompanying drawings required for describing the embodiments or the existing technology. Apparently, the accompanying drawings in the following description show some embodiments of the specification, and persons of ordinary skill in the art may still derive other drawings from these accompanying drawings without creative efforts.

DETAILED DESCRIPTION

Some embodiments are described in detail herein, and examples thereof are shown in the accompanying drawings. When the following description is involved with the accompanying drawings, unless otherwise noted, same numbers in different accompanying drawings refer to the same elements or similar elements. Implementation manners described in the following embodiments do not represent all implementations consistent with the specification. On the contrary, the implementations are merely examples of an apparatus and a method that are consistent with some aspects of the specification described in detail in claims.

The terms used in the embodiments of the specification are merely for the purpose of illustrating specific embodiments, and are not intended to limit the specification. The terms "a", "said" and "the" of singular forms used in the embodiments and the appended claims of this application are also intended to include plural forms, unless otherwise specified in the context clearly.

The term "and/or" used in this specification describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

Although the embodiments of the specification may describe XXXs by using terms such as first, second, and third, the XXXs should not be limited to these terms. These terms are merely used to distinguish the XXXs from each another. For example, a first XXX may be referred to as a second XXX, and similarly, the second XXX may be referred to as the first XXX without departing from a scope of the embodiments of the specification.

Depending on the context, for example, words "if" or "as if" used herein may be explained as "while . . . " or "when . . . " or "in response to determining" or "in response to detection". Similarly, depending on the context, phrases "if determining" or "if detecting (a stated condition or event)" may be explained as "when determining" or "in response to determining" or "when detecting (the stated condition or event)" or "in response to detection (the stated condition or event)".

It should be further noted that the terms "include", "contain", and any variants thereof are intended to cover a non-exclusive inclusion. Therefore, a merchandise or a system that includes a series of elements not only includes such elements, but also includes other elements not specified expressly, or but also includes inherent elements of the merchandise or the system. Unless otherwise specified, an element limited by "include a/an . . . " does not exclude other same elements existing in the merchandise or the system that includes the element.

Figure 1:
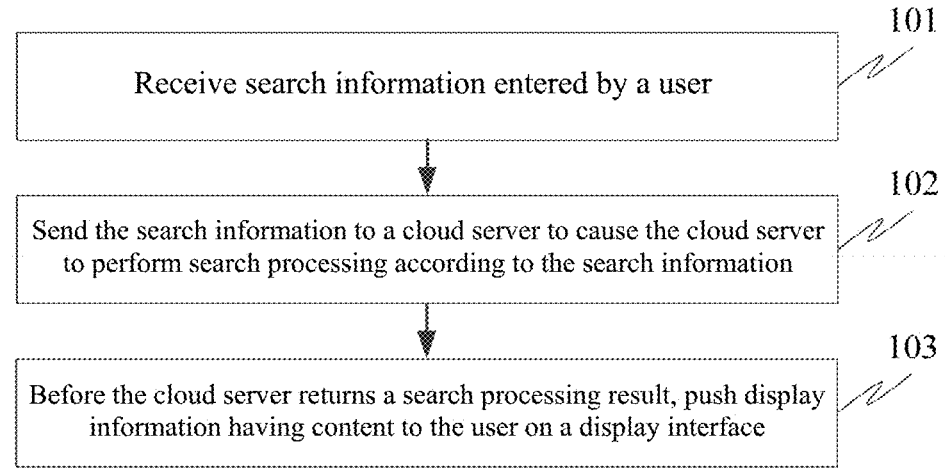
FIG. 1 is a schematic flowchart of a search information processing method according to an embodiment of the specification.

FIG. 1 is a schematic flowchart of a search information processing method according to an embodiment of the specification. This embodiment may be performed by a search information processing apparatus. The apparatus may be implemented by using hardware, or may be implemented by using hardware executing corresponding software. The apparatus may be implemented in any terminal device having a processor and a display apparatus and/or audio play. The terminal device may be, for example, a mobile terminal. The mobile terminal includes a tablet computer, a mobile phone, or the like.

The following uses an example in which the mobile terminal is a mobile phone and the search information processing apparatus is disposed in the mobile phone in a form of hardware or hardware executing corresponding software, to describe specific implementations of the search information processing method in the specification in detail. As shown in FIG. 1, the procedure includes:

Step 101. Receive search information entered by a user.

Implementation of this process may be specifically performed by using a search application set by the user on a mobile phone terminal, or operating a mobile phone terminal by the user to log in to a search engine of the Internet, so as to start a program for searching the search information. The search information entered by the user may be in a text form, a voice form, a picture form, or the like. A type of the search information is not limited in the specification.

Step 102. Send the search information to a cloud server to cause the cloud server to perform search processing according to the search information.

Step 103. Before the cloud server returns a search processing result, push display information having content to the user on a display interface.

In this step, the display information pushed to the user may be information in any data format, for example, audio display information, video display information, text display information, picture (such as an icon) display information, or animation display information. These formats of display information includes content, unlike the existing technology, in which only a dull ring symbol or wave symbol is presented.

In this embodiment, search information entered by a user is received, and the search information is sent to a cloud server to cause the cloud server to perform search processing according to the search information. Before the cloud server returns a search processing result, display information having content is pushed to the user on a display interface. In this way, the user does not need to wait for the search result dully, thereby improving user experience.

The following describes the process of the search information processing method in the specification in detail by using detailed embodiments. The following embodiments may be combined to each other. A same concept or process, or similar concepts or processes are not described in detail again in some embodiments.

Figure 2:
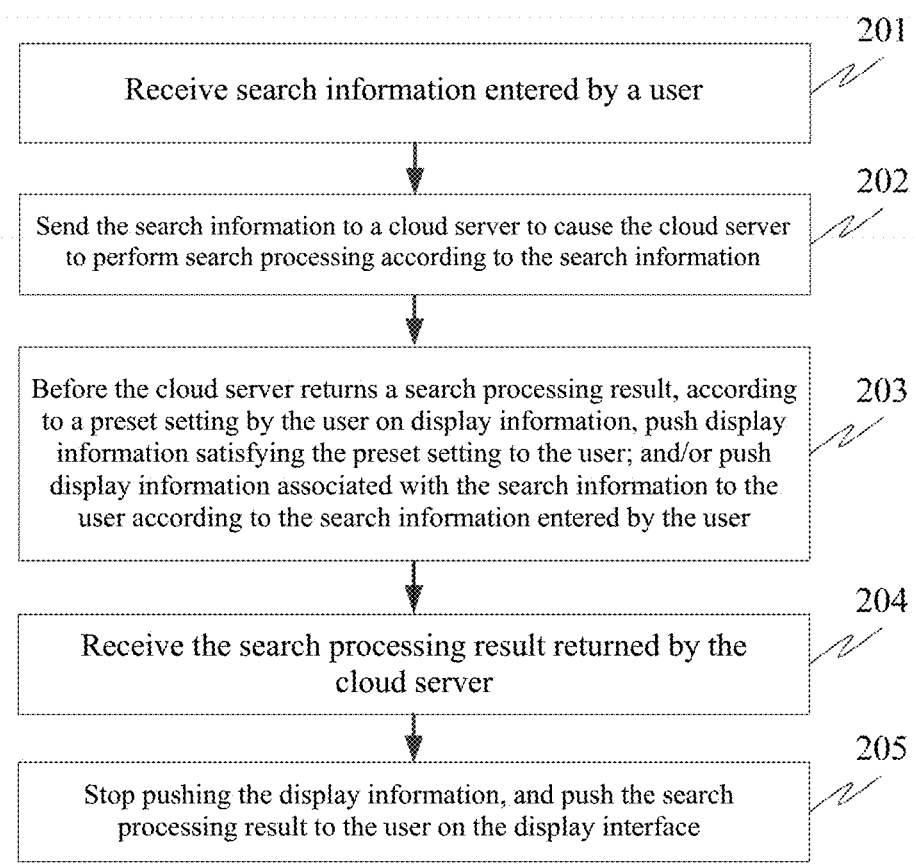
FIG. 2 is a schematic flowchart of a search information processing method according to an embodiment of the specification.

FIG. 2 is a schematic flowchart of a search information processing method according to an embodiment of the specification. In this embodiment, the search information processing method is described in detail by using a specific embodiment. The method includes:

Step 201. Receive search information entered by a user.

Step 202. Send the search information to a cloud server to cause the cloud server to perform search processing according to the search information.

Step 203. Before the cloud server returns a search processing result, according to a preset setting by the user on display information, push display information satisfying the preset setting to the user; and/or push display information associated with the search information to the user according to the search information entered by the user.

Specifically, the preset setting includes at least one of the following settings: a setting on a display form of the display information, and a setting on information content of the display information. For example, the user may select a display form of the display information on a terminal, for example, any one of display forms of a video, audio, an icon, and an animation, or a combination thereof. The display form may further include a setting on display duration of the display information, for example, 20 seconds of video display, or 30 seconds of picture display. If a terminal receives the returned search result before the preset display duration is reached, display information that has not been completely displayed may be automatically stopped or may be stopped after a feedback instruction from the user is received. The feedback instruction from the user is, for example, that the terminal pops up prompt information to the user, to query the user whether to stop displaying the current display information and display the search result instead. If the user selects "Yes", the terminal immediately stops displaying the display information, and pushes the search result to the user; or if the user selects "No", the terminal presents the search result after display of the current display information that has not been completely displayed is completed. The display form may further include a setting on an order of displaying the display information. For example, the user sets a priority of video display information to be higher than that of picture display information, a priority of English word display information to be higher than that of current news display information, and the like. In addition, the user may further set specific content of the display information, for example, video content, songs, photos in an album, English words, and current news expected to watch during a search waiting period.

The preset setting may be a setting preset by the user on content in a local storage of the terminal, so that the display information is obtained from the preset local storage, and the preset display information is pushed to the user. For example, the user presets songs in a local music favorite list as display information, sets a photo in a photo folder of a local album as display information, or so on. The preset setting may alternatively be a presetting by the user on a resource in the cloud server, so that the cloud server returns, according to the preset setting, the display information preset by the user to the terminal, and the terminal presents the display information to the user. Content to be pushed by the cloud server that is preset by the user may include display information subscribed to by the user from the cloud server, for example, at least one of the following: weather information, advertisement information, current news, and the like. The preset setting may alternatively be a combination of the foregoing sources. That is, according to different display information preset by the user, some display information may be obtained locally, and other display information may be obtained from cloud. The display information having content is not constant; otherwise, it is very difficult to release boring feelings of the user during waiting.

In an example, knowledge that needs to be learned by the user may be displayed in a search waiting process. For example, English words are used as the display information having content for display in the search waiting process. When performing a setting, the user may set words for display. Then, background software can randomly select a word for display. Certainly, randomly selecting a word is one manner. Alternatively, display may be automatically performed according to a study schedule.

In addition to a preset manner for obtaining the display information, information associated with an information type of the search information may be pushed to the user according to the search information entered by the user, to serve as the display information, and/or display information associated with information content of the search information may be pushed to the user. That is, according to search content, the user is enabled to know that a search server has received a search requirement of the user in a process of waiting for the search result and is performing searching at its best according to the requirement. Display content associated with the search information is fed back to the user during waiting, so that the user has perception, thereby increasing interaction and interactivity, and improving user experience. The display information associated with the information type of the search information means that the display information is obtained according to a type of information searched by the user. If the user searches for a song, the display information may be audio information. If the user searches for picture information, the display information may be picture information, and so on. The display information associated with the information content of the search information may be specifically obtained according to the search information entered by the user. A classification of the search information is determined, and then the display information associated with the classification is obtained according to the classification. The determining a classification of the search information may specifically include: analyzing semanteme of the search information, extracting subject content of the search information, and determining the classification of the search information according to the subject content. For example, the search information entered by the user is "clinic". The server determines, according to "clinic", that the classification of the search information is "medical", and obtains display information related to medical services, for example, medical icons or hospital names. For another example, if the search information entered by the user is "a movie theater around a place", semanteme of the search information is analyzed, keywords "place" and "movie theater" are obtained, then subject content "movie theater" is extracted according to the keywords, and display information related to movie theaters is obtained, for example, related information such as posters and movie names of current hot movies, or movie theater names.

Step 204. Receive the search processing result returned by the cloud server.

Step 205. Stop pushing the display information, and push the search processing result to the user on the display interface.

In this embodiment, a type, a display form, content, and the like of display information are preset, enriching display effects of the display information. In addition, the display information is obtained from different places such as a local memory and a cloud server, to provide the display information satisfying a personalized requirement to a user; so that the user not only can obtain information in which the user is interested from a locally stored resource, but also can subscribe to information in which the user is interested from cloud. Therefore, a waiting time in a search process is fully used, so that the process of waiting for a search result becomes interesting, thereby improving user experience.

Implementation of the foregoing step is described in detail by using specific application scenarios.

Figure 3:
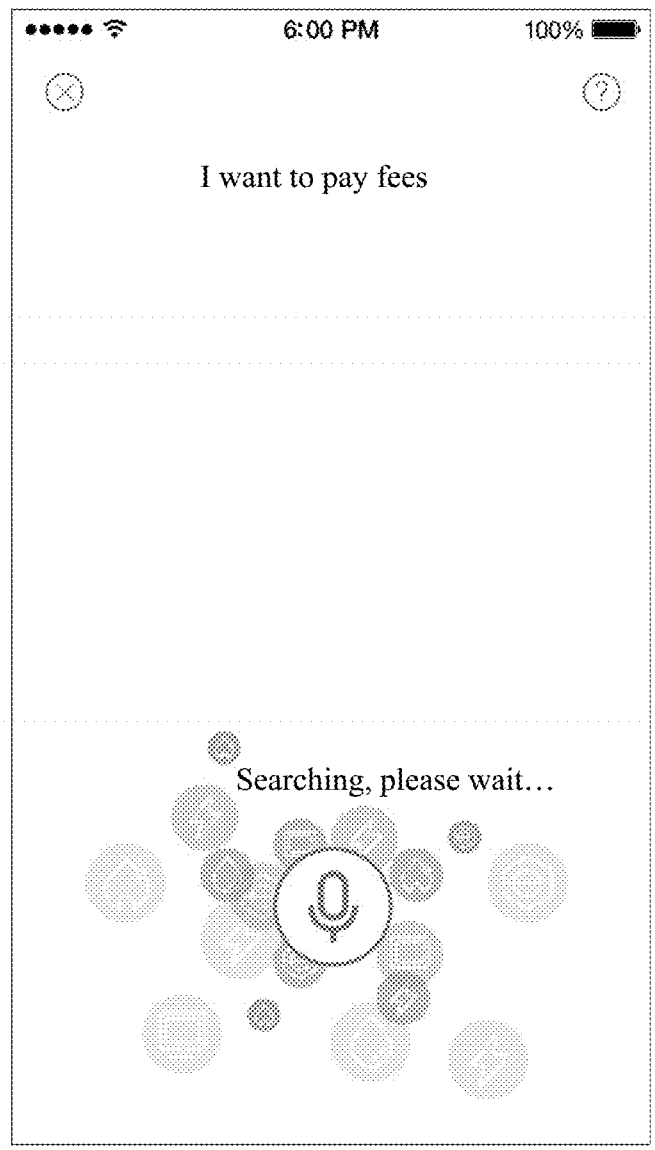
FIG. 3 is a schematic diagram of a search waiting interface in the embodiment shown in FIG. 2.

As shown in FIG. 3, a user activates a search button, and enters "I want to pay fees". A cloud server pushes display information related to "fee payment" to the user. An example in which the display information is picture-type information is used. Various patterns (pay water fees, electricity fees, gas fees, cable TV fees, fixed-line broadband fees, and property fees) shown in FIG. 3 are displayed in a process in which the user waits for a search result, to enable the user to know that the server has correctly received a search request of the user and is searching for related content.

Figure 4:
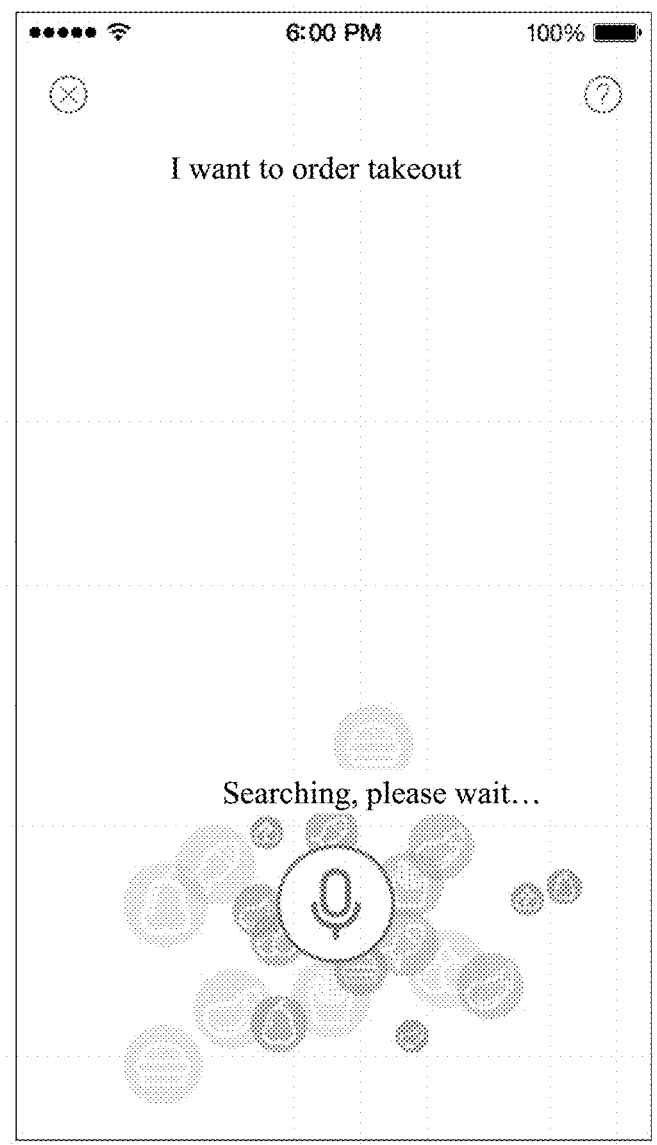
FIG. 4 is a schematic diagram of a search waiting interface in the embodiment shown in FIG. 2.

As shown in FIG. 4, a user activates a search button, and enters "I want to order takeout". A cloud server matches the keyword "takeout", and patterns related to takeout (chicken, ducks, fish, and meat, or logos related to takeout shops and the like) are dynamically presented during search loading, thereby achieving a visible search process for the user.

Figure 5:
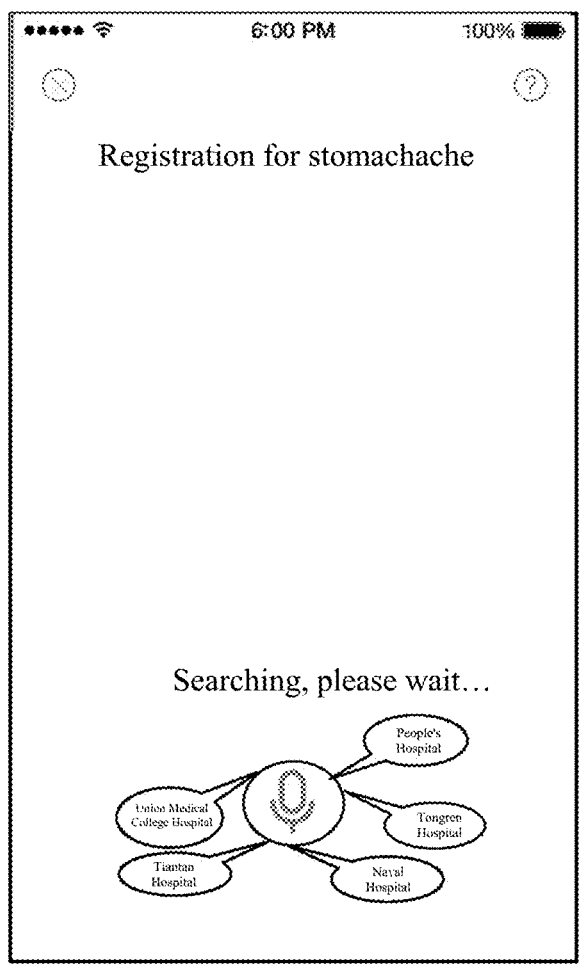
FIG. 5 is a schematic diagram of a search waiting interface in the embodiment shown in FIG. 2.

As shown in FIG. 5, a user activates a search button, and enters search information "registration for stomachache". The keywords "registration for stomachache" are matched. An example in which display information is text information is used. Names of hospitals treating stomachache are pushed to the user as associated display information, so that before the user obtains a complete search result, the user can view brief information about the hospitals.

Figure 6:
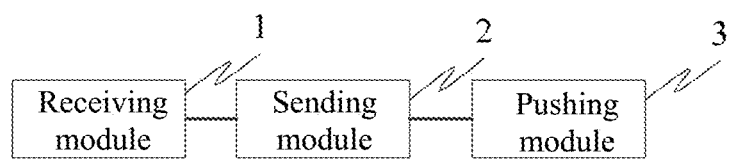
FIG. 6 is a schematic structural diagram of a search information processing apparatus according to an embodiment of the specification.

In addition, in the foregoing scenario examples, pushing of the display information may be visualized, may be heard in a form of audio, or may be a combination of the two pushing manners. FIG. 6 is a schematic structural diagram of a search information processing apparatus according to an embodiment of the specification. As shown in FIG. 6, functions of the apparatus may be implemented by using hardware or may be implemented by using hardware executing corresponding software. The hardware or software includes one or more modules corresponding to the foregoing functions. The apparatus includes:

a receiving module 1, configured to receive search information entered by a user;

a sending module 2, configured to send the search information to a cloud server to cause the cloud server to perform search processing according to the search information; and a pushing module 3, configured to: before the cloud server returns a search processing result, push display information having content to the user on a display interface.

The apparatus provided in this embodiment may be configured to perform the foregoing method embodiment. Their implementation principles and technical effects are similar. Details are not described herein again.

Figure 7:
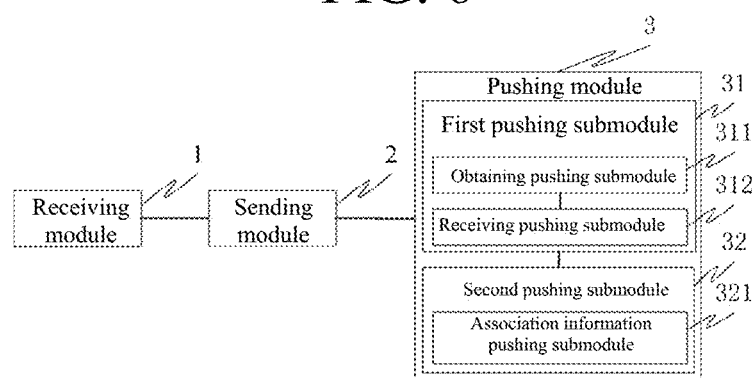
FIG. 7 is a schematic structural diagram of a search information processing apparatus according to an embodiment of the specification.

FIG. 7 is a schematic structural diagram of a search information processing apparatus according to an embodiment of the specification. This embodiment, in addition to the embodiment in FIG. 6, further includes:

The display information may include at least one of the following:

a picture, audio, a video, an animation, and text.

Optionally, the pushing module 3 includes:

a first pushing submodule 31, configured to push, according to a preset setting by the user on display information, display information satisfying the preset setting to the user; and/or a second pushing submodule 32, configured to push, according to the search information entered by the user, display information associated with the search information to the user.

Optionally, the preset setting includes at least one of the following settings: a setting on a display form of the display information, and a setting on information content of the display information.

Optionally, the first pushing submodule 31 includes:

an obtaining pushing submodule 311, configured to obtain the display information from a preset local storage, and push the display information to the user; and/or a receiving pushing submodule 312, configured to receive, according to a preset setting by the user on content to be pushed by the cloud server, the display information returned by the cloud server, and push the display information to the user.

Optionally, the second pushing submodule 32 includes:

an association information pushing submodule 321, configured to push, according to the search information entered by the user, display information associated with an information type of the search information to the user, and/or display information associated with information content of the search information.

Optionally, the preset setting by the user on the content to be pushed by the cloud server includes display information subscribed to by the user from the cloud server; and the subscribed display information includes at least one of the following: weather information, advertisement information, and current news.

Optionally, the receiving module 1 is further configured to receive the search processing result returned by the cloud server; and the pushing module 3 is further configured to stop pushing the display information, and push the search processing result to the user on the display interface.

The apparatus provided in this embodiment may be configured to perform the foregoing method embodiments. Their implementation principles and technical effects are similar. Details are not described herein again.

Finally, it should be noted that the foregoing embodiments are merely intended for describing the technical solutions of this application, but not for limiting the application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the application.

What is claimed is:

1. A search information processing method, comprising:
   receiving a setting by a user on information content of display information for displaying on a display interface between a first time of sending a search request to a cloud server and a second time of receiving a search result from the cloud server for the search request;
   receiving subscribed display information corresponding to the setting on information content;
   receiving search information from the user;
   sending the search information to the cloud server to cause the cloud server to perform search processing based on the search information;
   before the cloud server returns a search processing result associated with the search processing, displaying one piece of the subscribed display information to the user on the display interface;
   before entire content of the piece of the subscribed display information is completely displayed, receiving the search processing result from the cloud server;
   in response to receiving the search processing result, displaying a pop-up prompt on the display interface, wherein the pop-up prompt queries the user whether to stop displaying the piece of the subscribed display information and start to display the search processing result; and
   in response to a user selection to not stop displaying the piece of the subscribed display information, continuing to display the piece of the subscribed display information until the entire content is displayed and then displaying the search processing result; or
   in response to a user selection to stop displaying the piece of the subscribed display information, stopping displaying the piece of the subscribed display information and starting to display the search processing result.

2. The method of claim 1, wherein the display information comprises at least one of the following:
   a picture, audio, a video, an animation, and text.

3. The method of claim 1, wherein the setting further comprises:
   a setting on a display form of the display information.

4. The method of claim 1, further comprising:
   obtaining the one piece of the subscribed display information from a local storage.

5. The method of claim 1, wherein:
   the subscribed display information comprises at least one of the following: weather information, advertisement information, and current news.

6. A system comprising a processor and a non-transitory computer-readable storage medium storing instructions executable by the processor to cause the system to perform operations comprising:
   receiving a setting by a user on information content of display information for displaying on a display interface between a first time of sending a search request to a cloud server and a second time of receiving a search result from the cloud server for the search request;

receiving subscribed display information corresponding to the setting on information content;

receiving search information from the user;

sending the search information to the cloud server to cause the cloud server to perform search processing based on the search information;

before the cloud server returns a search processing result associated with the search processing, displaying one piece of the subscribed display information to the user on the display interface;

before entire content of the piece of the subscribed display information is completely displayed, receiving the search processing result from the cloud server;

in response to receiving the search processing result, displaying a pop-up prompt on the display interface, wherein the pop-up prompt queries the user whether to stop displaying the piece of the subscribed display information and start to display the search processing result; and in response to a user selection to not stop displaying the piece of the subscribed display information, continuing to display the piece of the subscribed display information until the entire content is displayed and then displaying the search processing result; or in response to a user selection to stop displaying the piece of the subscribed display information, stopping displaying the piece of the subscribed display information and starting to display the search processing result.

7. The system of claim 6, wherein the display information comprises at least one of the following:

a picture, audio, a video, an animation, and text.

8. The system of claim 6, wherein the setting further comprises:

a setting on a display form of the display information.

9. The system of claim 6, wherein the operations further comprise obtaining the display information from a local storage.

10. The system of claim 6, wherein:

the subscribed display information comprises at least one of the following: weather information, advertisement information, and current news.

11. A non-transitory computer-readable storage medium configured with instructions executable by one or more processors to cause the one or more processors to perform operations comprising:

receiving a setting by a user on information content of display information for displaying on a display interface between a first time of sending a search request to a cloud server and a second time of receiving a search result from the cloud server for the search request;

receiving subscribed display information corresponding to the setting on information content;

receiving search information from the user;

sending the search information to the cloud server to cause the cloud server to perform search processing based on the search information;

before the cloud server returns a search processing result associated with the search processing, displaying one piece of the subscribed display information to the user on the display interface;

before entire content of the piece of the subscribed display information is completely displayed, receiving the search processing result from the cloud server;

in response to receiving the search processing result, displaying a pop-up prompt on the display interface, wherein the pop-up prompt queries the user whether to stop displaying the piece of the subscribed display information and start to display the search processing result; and in response to a user selection to not stop displaying the piece of the subscribed display information, continuing to display the piece of the subscribed display information until the entire content is displayed and then displaying the search processing result; or in response to a user selection to stop displaying the piece of the subscribed display information, stopping displaying the piece of the subscribed display information and starting to display the search processing result.

12. The non-transitory computer-readable storage medium of claim 11, wherein the display information comprises at least one of the following:

a picture, audio, a video, an animation, and text.

13. The non-transitory computer-readable storage medium of claim 11, wherein the setting further comprises:

a setting on a display form of the display information.

14. The non-transitory computer-readable storage medium of claim 11, wherein the operations further comprise:

obtaining the display information from a local storage.

15. The non-transitory computer-readable storage medium of claim 11, wherein:

the subscribed display information comprises at least one of the following: weather information, advertisement information, and current news.

* * * * *